R. P. JOHNSON & E. W. RAMSEY.
BOLL WEEVIL DESTROYER.
APPLICATION FILED MAR. 23, 1909.
951,441.
Patented Mar. 8, 1910.
2 SHEETS—SHEET 1.
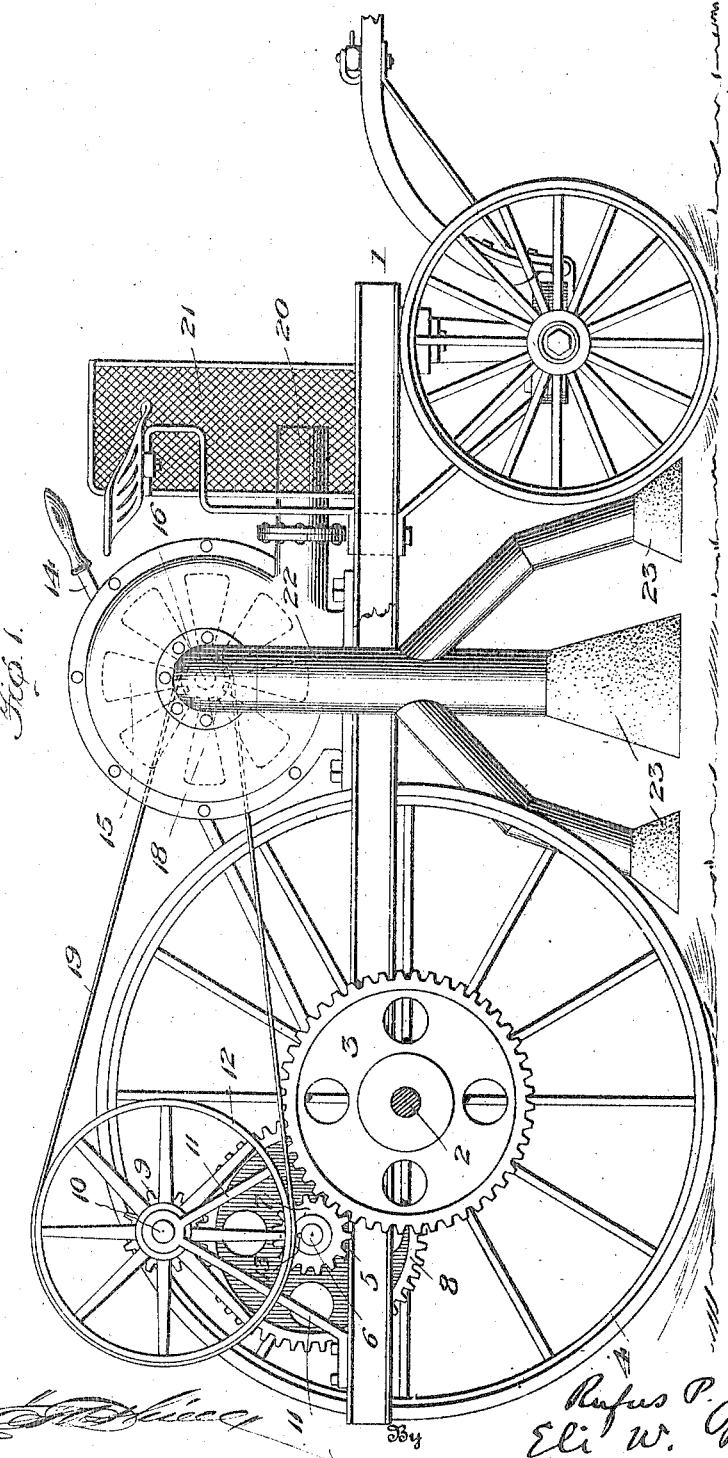

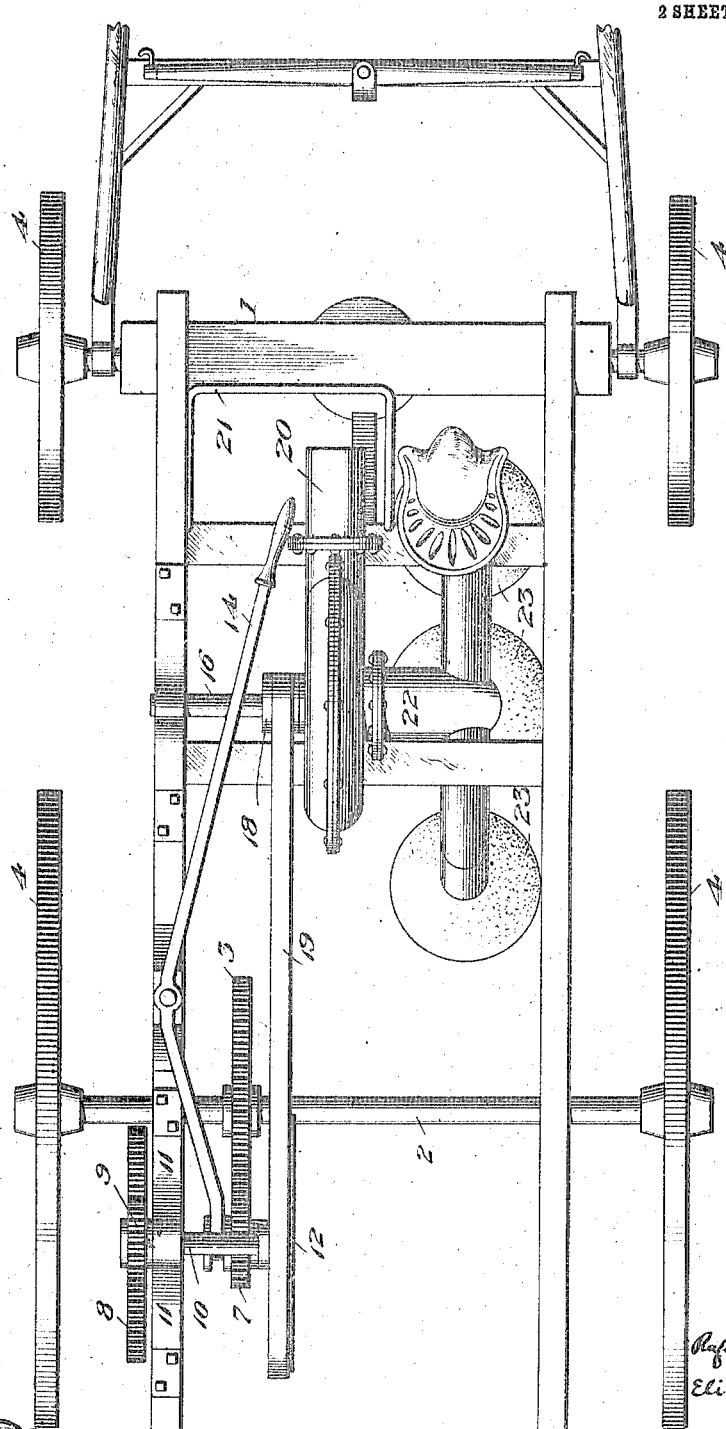

UNITED STATES PATENT OFFICE.

RUFUS P. JOHNSON AND ELI W. RAMSEY, OF DALLEY, LOUISIANA.

BOLL-WEEVIL DESTROYER.

951,441.

Specification of Letters Patent. Patented Mar. 8, 1910.

Application filed March 23, 1909. Serial No. 485,316.

*To all whom it may concern:*

Be it known that we, RUFUS P. JOHNSON and ELI W. RAMSEY, citizens of the United States, residing at Dalley, Jackson parish, and State of Louisiana, have invented certain new and useful Improvements in Boll-Weevil Destroyers, of which the following is a specification.

Our invention relates to boll weevil destroyers.

The hibernated boll weevil lives from twelve to forty-eight days after hibernation and punctures some of the first squares that appear on the cotton plant, depositing eggs in the cotton squares which immediately drop off the plant, carrying with them the eggs which subsequently germinate into adult boll weevils. The adult boll weevil has the peculiar characteristic that when disturbed while on the plant, it will sulk and drop off to the ground.

Appreciating these facts, the present invention has for its object the provision of a novel machine adapted for taking up the fallen cotton squares and contained weevils which have dropped from the plants on to the ground and which will also be adapted to pass and agitate the cotton plant and thereby cause the loose cotton squares that have been punctured and also the adult boll weevils to fall to the ground, whereby not only the adult weevils are destroyed but the larvæ of the weevil are also destroyed, thus effectually ridding the plants and ground of the pest.

In carrying out our invention we employ a suction apparatus of novel construction carried by a moving vehicle, which sucks up the fallen squares, the larvæ, and adult weevil and discharges them into a receptacle, the contents of which may be destroyed.

The invention is fully set forth hereinafter and its novel features are recited in the appended claims.

In the accompanying drawings:—Figure 1 is a side elevation, partly in section; and Fig. 2, a plan view.

The apparatus is carried by a suitable vehicle 1 which may be drawn by a horse or otherwise suitably propelled.

Secured to the rear axle 2 is a gear 3. If desired the traction wheels 4 may be connected to the axle 2 by pawl and ratchet mechanism so that any backward movement of the vehicle will not cause operation of the apparatus.

Journaled in a suitable box 5 carried by the frame 1 is a shaft 6 which carries a pinion 7 meshing with the gear 3 and also a large gear 8 which in turn meshes with a pinion 9 on a shaft 10 journaled in standards 11 and carrying a belt wheel 12. This provides a multiplying gearing whereby the relatively slow rotation of the axle 2 is transformed into comparatively high rate of rotation of the belt wheel 12. The pinion 7 is preferably loosely splined on its shaft as at 13 so that it may be slipped into or out of mesh with the gear 3, a lever 14 being provided for the convenient operation of this gear, whereby the exhaust apparatus may be thrown out of operation at any time, as, for instance, when the machine is moving to or from the field.

Mounted on the frame 1 is an exhaust fan 15 the shaft 16 of which is provided with a pulley 18 which is connected by a belt 19 to the pulley 12 whereby the rate of rotation of the fan is multiplied much beyond that of the pulley 12. The discharge or outlet 20 of the fan leads into a receptacle 21 whose sides are preferably screened, said receptacle being made detachable so that it can be readily removed to destroy the contents thereof. The inlet or suction pipe 22 of the fan depends from the machine and is provided with any desired number of mouths or hoods 23 which are, by preference, made of rubber or other suitable flexible fabric whereby they will yield or give, thus preventing injury to the cotton plants. These mouths or hoods are preferably flared so that they will the better suck up the fallen cotton squares and the larvæ, but by reason of their flexibility, they gently agitate the cotton plants, without injuring them, and thus shake off the adult weevils or cause them to sulk and drop off and by providing a plurality of these suction mouths or hoods, the complete gathering of the fallen cotton squares, larvæ, and adult weevils is insured.

In operation the machine is drawn along the exhaust fans being given a high rate of rotation by the motion of the vehicle, the suction mouths gathering up the weevils, fallen squares, and adult weevils and displacing the squares which are loose on the cotton plants, the entire mass being sucked up into the pipe 22 and thence blown, via pipe 20, into the receptacle 21. Subsequently the receptacle 21 is removed and its contents destroyed. When use of the suction apparatus is not required, the lever 14 is operated to unmesh the gearing.

Having thus described our invention, what we claim as new and desire to secure by Letters Patent, is:—

1. In a cotton boll weevil destroyer, the combination with a suction apparatus adapted to be moved about the plants, of an enlarged, hood-like suction mouth of flexible material in communication with the suction apparatus and adapted to be presented to and about the plants.

2. In a cotton boll weevil destroyer, the combination with a movable vehicle, of a suction apparatus carried thereby, a stationary depending suction pipe in communication with the suction apparatus, and an enlarged, hood-like suction mouth of flexible material carried by said pipe in position to move adjacent the plants.

3. In a cotton boll weevil destroyer, the combination with a movable vehicle, of a suction apparatus carried thereby, and a plurality of depending suction mouths located in line, one behind the other in position to move adjacent the plants.

4. In a cotton boll weevil destroyer, the combination with a movable vehicle, of a suction apparatus carried thereby, a stationary depending suction pipe in communication with the suction apparatus, branches extending from said pipe in front and rear thereof, and enlarged, hood-like, suction mouths, of flexible material, carried by the pipe and the respective branches, one behind the other, in position to move adjacent the plants.

In testimony whereof, we hereunto affix our signatures in presence of two witnesses.

RUFUS P. JOHNSON.
ELI W. RAMSEY.

Witnesses:
　WM. H. HEARN,
　G. C. GARNER.